Figure 1:
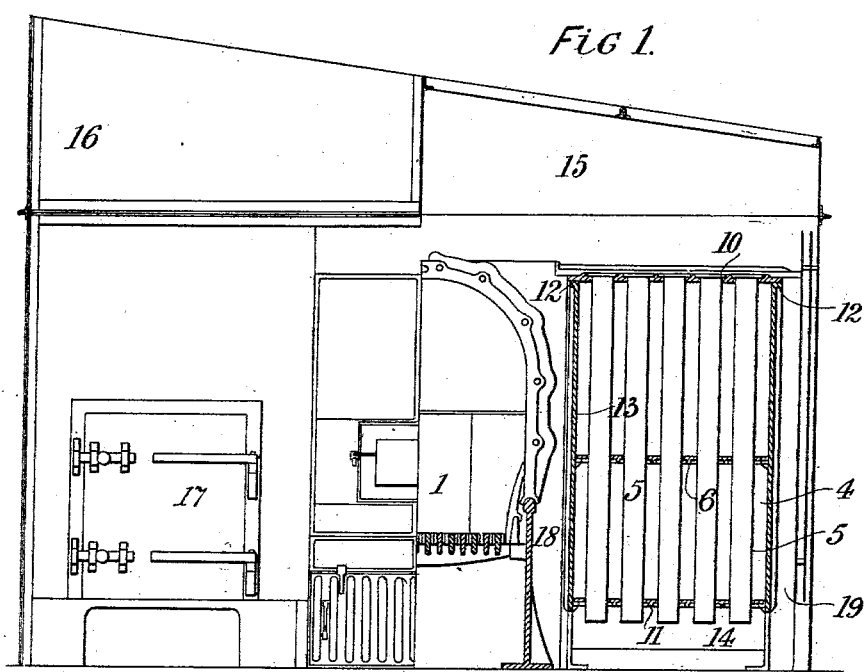

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 1.

WITNESSES: INVENTOR:
Fred White Samuel Cleland Davidson,
Thomas Wallace By his Attorneys:

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 2.
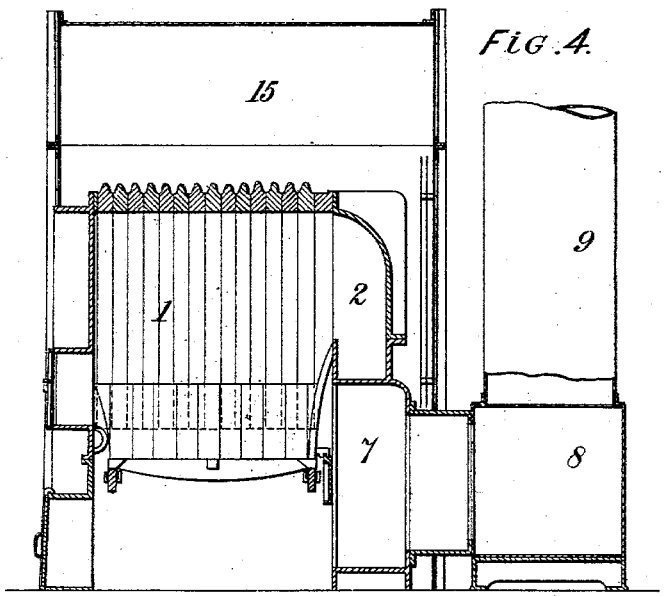
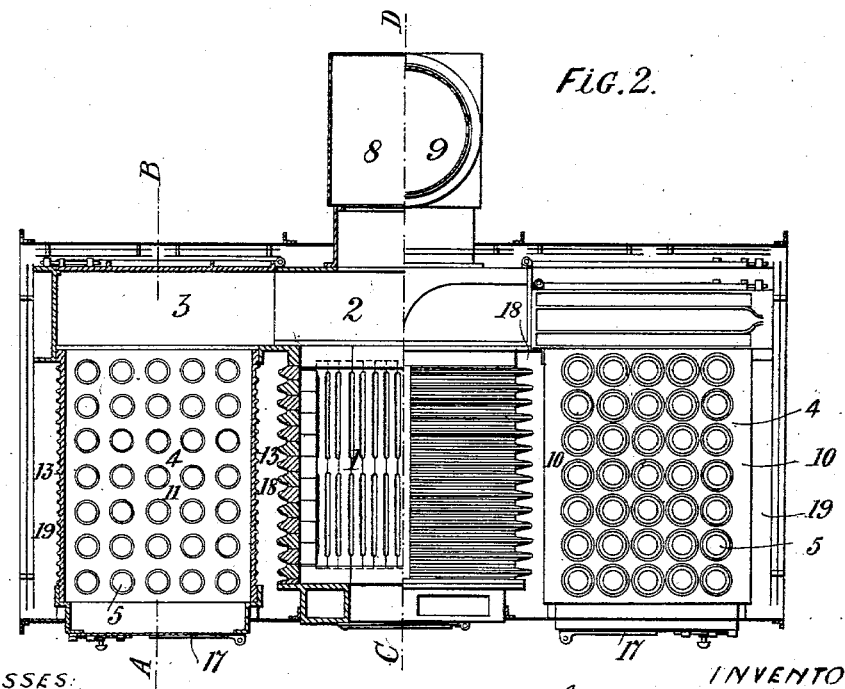

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 3.
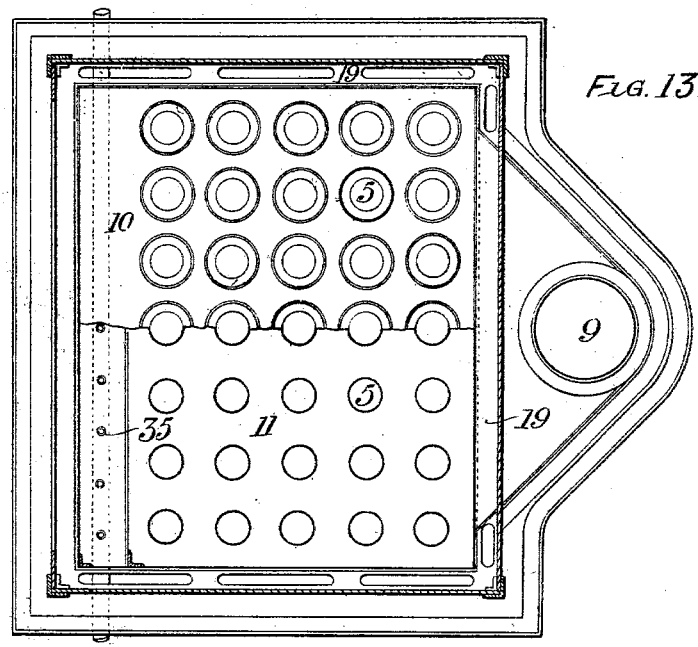
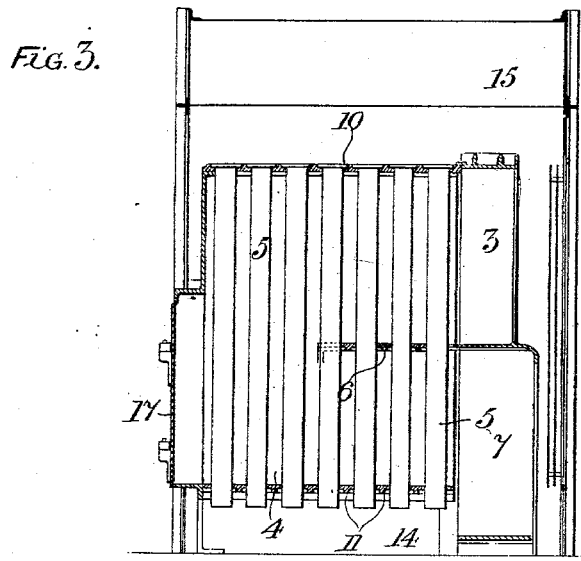
WITNESSES: INVENTOR:
Samuel Cleland Davidson,
By his Attorneys No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 4.
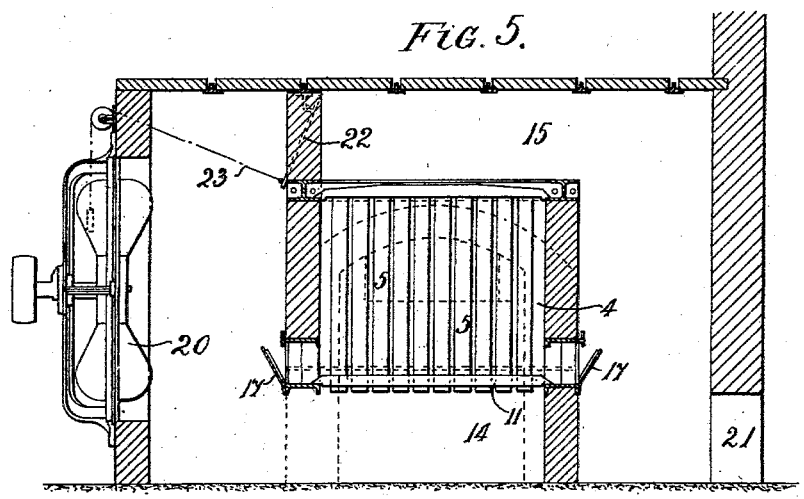
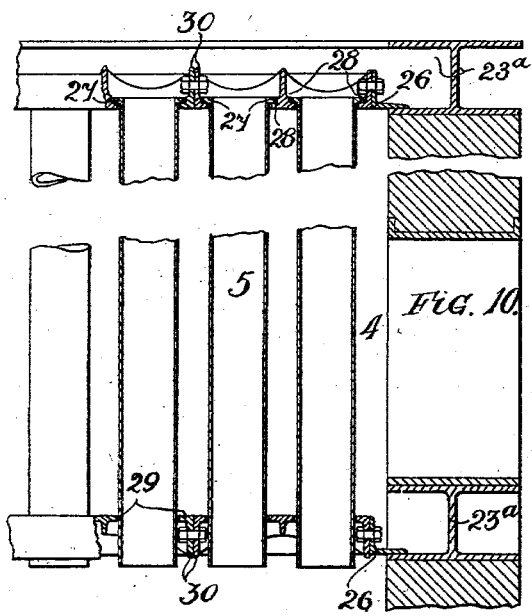
WITNESSES:  
INVENTOR  
Samuel Cleland Davidson,  
By his Attorneys No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 5.

WITNESSES:
Fred White
Thomas Wallace

INVENTOR:
Samuel Cleland Davidson,
By his Attorneys

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 6.
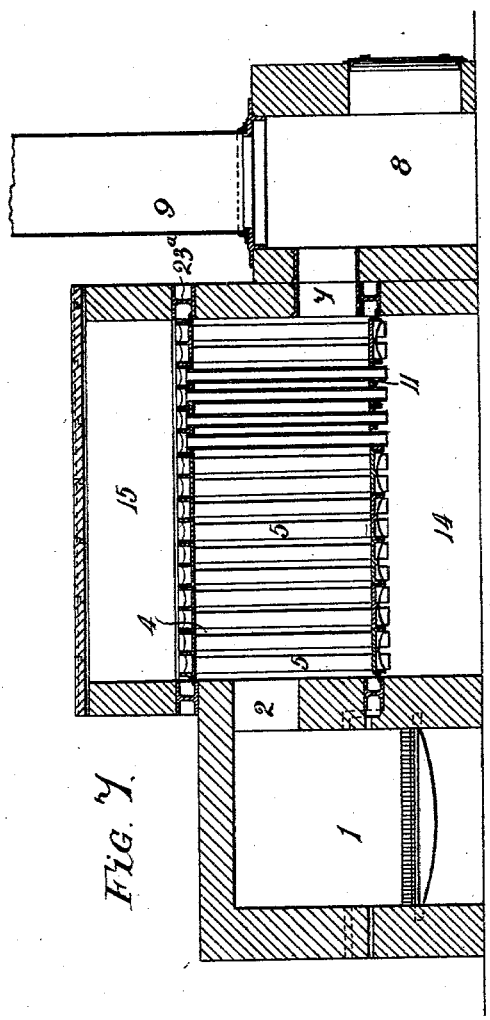
WITNESSES
Fred White
Thomas Wallace
INVENTOR
Samuel Cleland Davidson
By his Attorneys No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 7.
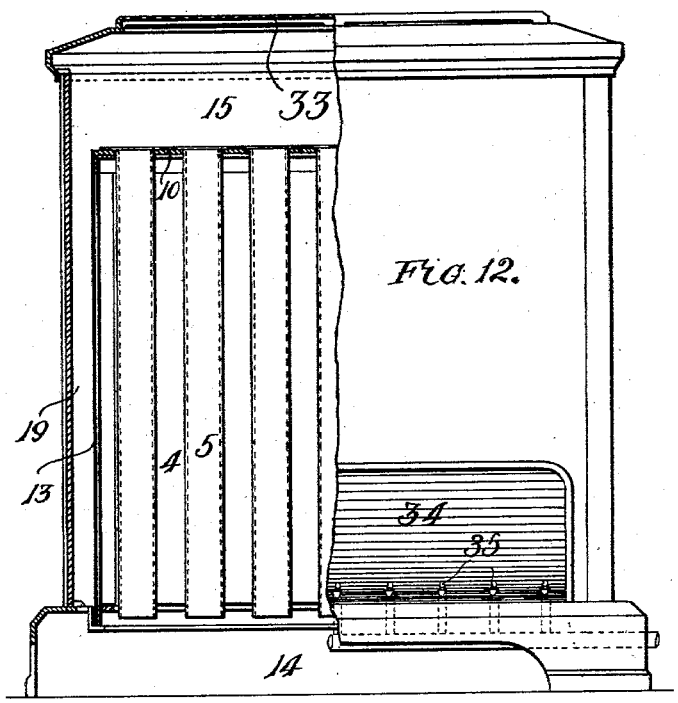
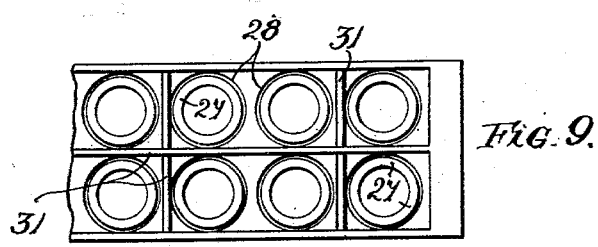

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 8.
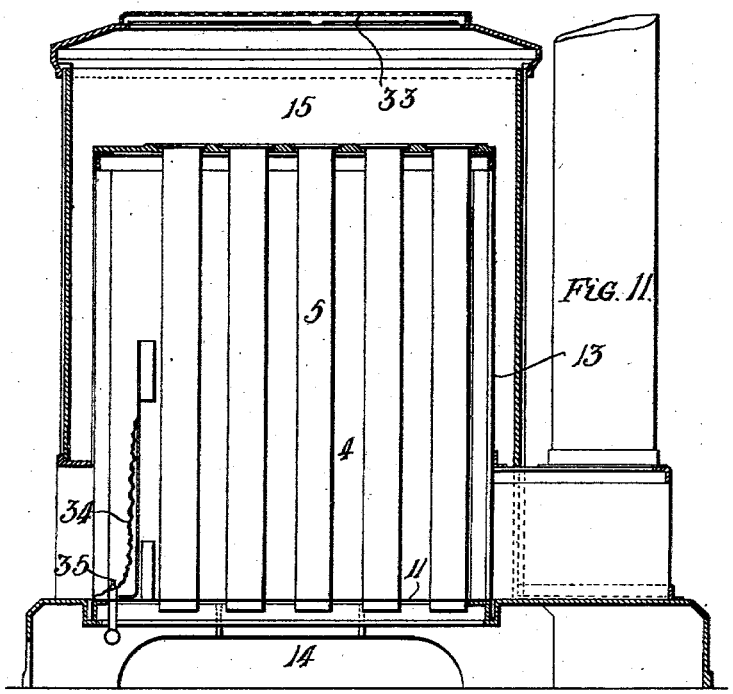
WITNESSES:
Fred White
Thomas Wallace
INVENTOR:
Samuel Cleland Davidson,
By his Attorneys:

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 9.

WITNESSES
Fred White
Thomas Wallace

INVENTOR:
Samuel Cleland Davidson,
By his Attorneys:

No. 746,682. PATENTED DEC. 15, 1903.
S. C. DAVIDSON.
STOVE OR APPARATUS FOR HEATING AIR.
APPLICATION FILED APR. 11, 1903.
NO MODEL. 10 SHEETS—SHEET 10.

WITNESSES: INVENTOR:
Fred White Samuel Cleland Davidson,
Thomas Wallace By his Attorneys No. 746,682. Patented December 15, 1903.

UNITED STATES PATENT OFFICE.

SAMUEL CLELAND DAVIDSON, OF BELFAST, IRELAND.

STOVE OR APPARATUS FOR HEATING AIR.

SPECIFICATION forming part of Letters Patent No. 746,682, dated December 15, 1903.

Application filed April 11, 1903. Serial No. 152,145. (No model.)

*To all whom it may concern:*

Be it known that I, SAMUEL CLELAND DAVIDSON, merchant, of Sirocco Engineering Works, Belfast, Ireland, have invented certain new and useful Improvements in Stoves and Apparatus for Heating Air, of which the following is a specification.

My invention has reference to stoves or apparatus for heating air, and relates in part to air-heating stoves of the type described in the specification of my previous United States Patent No. 553,576, dated January 28, 1896, (hereinafter referred to as my "previous" specification.)

The objects of my invention are to so improve the constructive arrangement and design of said air-heating stoves or apparatus as to obtain therewith a higher ratio of economy in regard to the quantity of fuel consumed therein relatively to the amount of heat imparted to the air passing through same and also to so provide for the free expansion and contraction of the principal component parts of the stove so as to enhance its durability.

In said previous specification the form of apparatus described and shown consisted of a central furnace constructed as a gill-stove the products of combustion from which passed into and were conducted from a smoke-chamber situated at the back of the furnace through a series of horizontally-arranged tubes or pipes on each side of the furnace to a front smoke-chamber, from whence they returned through a similar series of horizontal tubes at a lower level to the back of the furnace and thence escaped into the chimney, the outer surfaces of each of said series of horizontal tubes being utilized as air-heating surfaces.

According to my present invention the heated products of combustion are caused to circulate around the exterior of the air-heating tubes, which are vertical or inclined and open-ended and inclosed in a suitable chamber, the walls of which also form air-heating surfaces fitted with gills or not, and, further, the said tube-chambers are so constructed that the joints of the tubes with the surfaces in which they are carried in the chamber or of one portion of the chamber with the other where likely to be effected by expansion are made by what may be termed a "resting" contact or joint—that is to say, the weight of one part on the other, together with sufficient surfaces in contact, serves to make a joint efficient for the purpose to prevent leakage of smoke and at the same time allows the necessary expansion of the parts. In the case of the tubes the upper ends only take their weight by a suitable flange, while their lower ends make a sliding joint. The upper joint may in some cases be reinforced with red lead or suitable cement. The vertical sides of said tube-chamber may be constructed of flat metal plates or as brick walls, and the horizontal top and bottom sides are formed of metal plates, (hereinafter called the "upper" and "lower" tube-plates, respectively,) in which suitable orifices in corresponding positions in said top and bottom tube-plates are provided for insertion of the vertical tubes.

Figure 8:
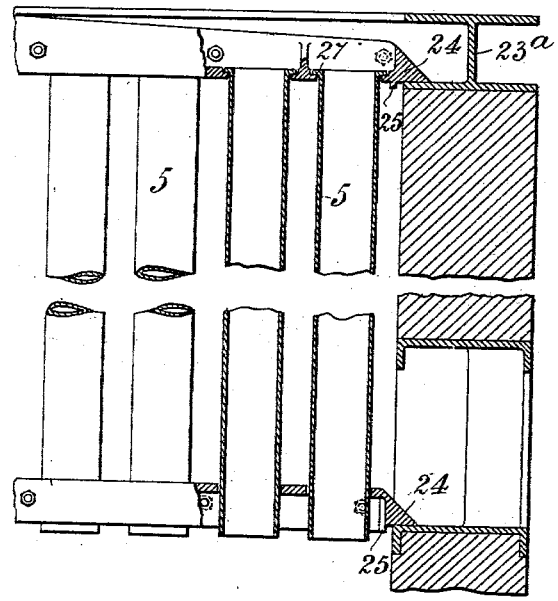
Figure 6:
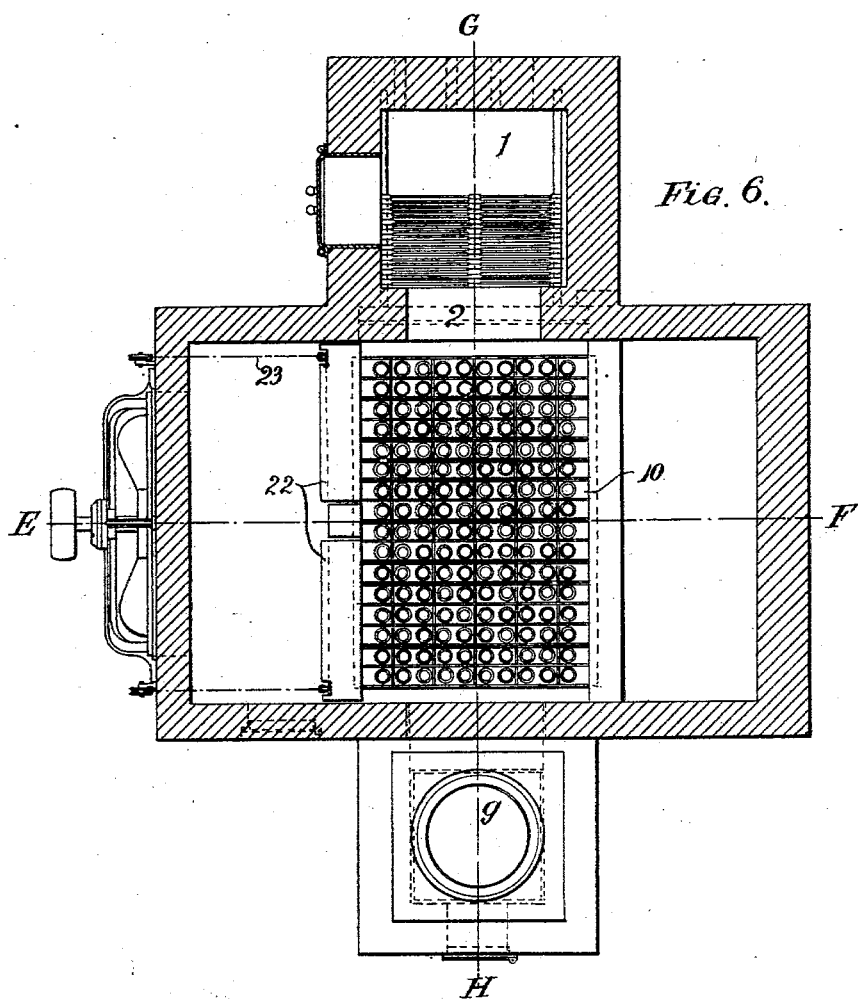
Figure 14:
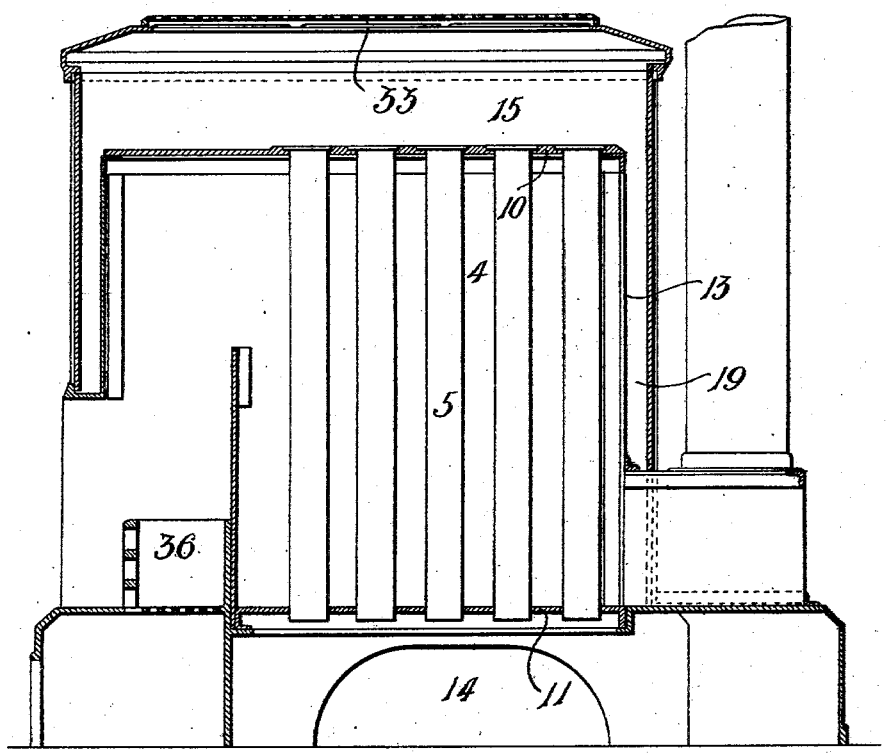
Figure 15:
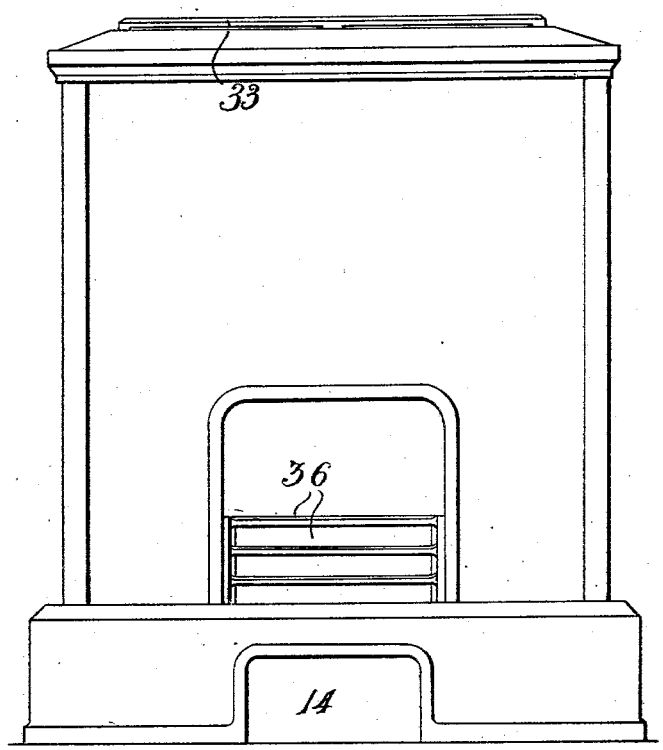

In the accompanying drawings, which show how the invention is carried into effect, Figure 1 is a front elevation, partly in vertical section, showing one form of my improved air-heating apparatus, having a central furnace with a tube-box on each side thereof, the vertical sides of said tube-box being of cast-iron with gills or ribs on their outer surfaces and the inclosing casing around the complete stove being constructed of sheet metal. Fig. 2 is a plan of Fig. 1, partly in horizontal section; and Figs. 3 and 4 are respectively vertical sections on lines A B and C D of Fig. 2. Figs. 5, 6, and 7 show a modification of my improved air-heating apparatus. Fig. 5 is a vertical section through the tube-box and air-chamber on line E F of Fig. 6. Fig. 6 is a plan of the apparatus. Fig. 7 is a vertical section of the heater on the line G H of Fig. 6. The same reference-numbers indicate corresponding parts in all these figures. Figs. 8, 9, and 10 are details, in sectional elevation and plan, to an enlarged scale, showing the joints between the tubes and the tube-plates and the tube-plates with the walls of the stove. Figs. 11, 12, and 13 show another modification of my invention, Fig. 11 being a side sectional elevation; Fig. 12, a front elevation, partly in section, and Fig. 13 a plan showing part of the top tube-plate and part of the bottom tube-plate. Figs. 14 and 15 are a sectional side elevation and front view of a construction similar to that shown in Figs. 11 and 12.

Referring to Figs. 1, 2, 3 and 4, in this construction of my improved air-heating stoves I still employ the central furnace arranged as described in my previous specification—that is to say, as a gill-stove—and carry the products of combustion through one or more smoke-chambers at the back of said furnace; but instead of employing the arrangement of horizontal tubes with the products of combustion passing through their interior and having the air heated by contact with their exterior surfaces, as described in my said previous specification, (and which exterior surfaces dissipated a considerable portion of their heat by radiation without doing any effective duty toward heating the air,) I now employ a series or battery of approximately vertical or inclined tubes (hereinafter referred to and shown as "vertical" tubes) passing from top to bottom of a box or chamber (hereinafter called the "tube-box") situated on each side of said gill-stove furnace. In these drawings 1 is the central furnace, at back of which a chamber 2 is provided for passage of the products of combustion from the furnace to the back smoke-chamber 3 and thence to the tube-boxes 4 4, from which said products of combustion, after passing around the outer surfaces of the tubes 5 5 and around the baffle-plate 6, escape through the chamber 7, Figs. 3 and 4, to the smoke-box 8 at the base of the chimney 9. 10 10 are the top tube-plates, in which the top ends of the vertical tubes 5 are supported, and 11 11 are the bottom tube-plates, through which the lower ends of the tubes project. Said tube-plates in this modification are shown as being each an integral casting having orifices for the vertical tubes, as hereinbefore described. The joints 12 of the tube-plates with the upper edges of the vertical sides 13 of the tube-box on which they are supported are so arranged as to permit of free lateral movement of the tube-plates by expansion and contraction under the influence of the great variations in temperature to which they are necessarily subject. The bottom ends of the tubes are open and communicate with an air-space 14, through which the air to be heated enters and after ascending through the tubes reaches and escapes from their top ends into the collecting-chamber 15, from which it passes into the air-duct 16, which in these drawings is shown at the side of the collecting-chamber; but the particular form of this air-duct and its position relative to the collecting-chamber may be modified to suit circumstances, and the heated air may either be allowed to escape by natural flow from said air-duct or the latter may be connected to a fan, so that the passage of the air through the heater may be accelerated by mechanical means. The tube-boxes are fitted at each end with cleaning-doors 17 for removing any accumulation of sooty deposit which may gather in them, and in order to provide for the very unequal expansion which takes place in the furnace relatively to the tube-boxes the latter are entirely disconnected from the furnace 1, except where they are attached to the chamber 2 at back of the furnace, so that clear air-spaces 18 are thus left between the sides of the tube-box and the exterior of the furnace sides, which spaces are open at top and bottom for passage of air, which so effectively carries off the heat in the sides of the furnace and tube-box as to prevent these reaching an unduly high temperature. On the opposite side of the tube-boxes similar spaces 19 are provided between them and the sides of the casing opposite same, so that practically all the outer exposed surfaces of the tube-boxes constitute air-heating surfaces in addition to those provided by the tubes themselves.

Referring now to Figs. 5, 6, and 7, in the form here shown the vertical sides of said tube-box and the inclosing casing of the heater are as a whole constructed of brickwork and the tube-plates are shown constructed of a series of tube-plate sections laterally connected up to one another. 20 is a fan of the propeller type for driving the air to be heated into the air-spaces of the heater and up through the tubes into the collecting-chamber and thence downward again to an exit 21 at the ground-level, from whence it may be conveyed by a duct to a drying-kiln or otherwise dealt with in accordance with requirements. In Fig. 5 a valve 22 is shown over the top of the tube-box for admitting air into the collecting-chamber 15, the opening or closing of which valve by means of the chain 23 admits a portion of the cold-air supply from the fan direct into the collecting-chamber, where it mixes with and reduces to any required extent (according to the amount that the valve is opened) the temperature of the heated air arising from the tubes, and thus affords a means of controlling same if it gets too high for the purposes required.

Referring to Figs. 8 and 9, in this form the ends of the tube-plates are supported in channel-irons 23 of H-section built into the brickwork forming the vertical side walls of the tube-chamber to permit freedom of movement under the influence of expansion or contraction, as hereinbefore more particularly described. In these views the ends 24 of the tube-plate sections project into the hollow of and are supported in a resting contact or joint with the channel-iron frames 23, and on their under side at both ends close to said channel-iron frames are studs 25, which limit to a sufficient extent any to-and-fro movement due to expansion and contraction of the tube-plate sections in the channel-iron frames to prevent the sections shifting endwise in either direction so far as to work their opposite ends off the supporting-flange of the channel-iron frames.

By the above construction no brickwork rests upon or directly touches the tube-plate, and the latter can therefore expand freely or contract within said channel-like cavities without communicating any thrust or effecting damage of any sort.

Fig. 10 shows more clearly how the sides of the sections rest upon and form a smoke-tight joint with the supporting-flange of the channel-iron frames. The side of the terminal section contiguous to said channel-iron frame has a detachable angle-iron flange 26 bolted upon it, so that the horizontal flange of the angle-iron projects over and rests with a sliding contact upon the supporting-flange of the channel-iron frame, and studs 25, as already described in respect of the ends of each tube-section, limit the distance of the sliding movement in one direction, while those on the terminal section at opposite side of the tube-chamber limit its movement in the other direction. The attachment of said angle-irons to the outer sections of the top and bottom tube-plates is shown sufficiently clearly in Fig. 10 to require no further description.

Figs. 8 and 10 also show the manner in which the flanges 27 on the upper ends of the vertical tubes rest in the grooves or sockets 28 of the tube-plates or tube-plate sections, and the joints between same are preferably luted with cement or red lead, the weight of the tube itself keeping the meeting faces of the flanges on the tubes and said grooves in sufficiently close contact to form an effective joint to prevent leakage of smoke. The joint would not be smoke-tight without the cement or equivalent luting, and the socket into which the flange of the tube fits holds the cement in place, so as to increase its durability and make it, in fact, substantially permanent. These figures also show the nature of the sliding joint which the plain bottom ends of the tubes make at 29 with the orifices through which they pass in the bottom tube-plate sections. 30 30 are flanges on the side of the tube-plate sections by means of which two adjacent sections are bolted to one another, and 31 represents cross-ribs, which serve to strengthen said tube-plate sections.

It will be obvious that the above general arrangement whereby the tube-box is built up of tube-plate sections in each of which one or more rows of vertical tubes may be employed is specially suitable for the construction of air-heating apparatus of different and very large sizes, as any required number of sections may be built together side by side and the whole inclosed in a suitable brick or sheet-metal chamber to form any required size of air-heating apparatus.

In the form shown in Figs. 11, 12, and 13 gas-jets are employed in the furnace or fireplace, with the tube-box located at back of same, the heater as a whole being inclosed in a suitable casing of sheet metal and the exit from the collecting-chamber 15 for the heated air being formed of a perforated grid or plate 33 on top of same, which allows the air to ascend freely into the atmosphere of a room or compartment in which the heater is located. The spaces 19 between the sides of the tube-box and the sides of said casing form passages for air, which absorb the heat from the sides of the tube-box by convection, so that the sides of the casing always remain cool. In Figs. 11 and 12 a corrugated sheet of polished copper 34 is shown at the back of the gas-jets 35 for the purpose of enhancing the appearance of the stove when lighted.

In the form shown in Figs. 14 and 15 an open grate 36 for coal or other fuel is shown in lieu of the gas-jets in the modification shown in Figs. 11, 12, and 13, the general arrangement of the apparatus being similar in other respects.

What I claim, and desire to secure by Letters Patent, is—

1. In a multitubular stove or apparatus for heating air, the combination of a furnace inclosed by walls having external air-heating gills, a tube-chamber through which the products of combustion from said furnace pass, an air-space below said tube-chamber, an air-collecting chamber above said tube-chamber, upper and lower tube-plates forming the roof and floor of said tube-chamber and making smoke-tight joints with the side walls by resting contact therewith so that the surfaces in contact slide freely under expansion and contraction, open-ended tubes forming air-passages between the lower air-space and the upper air-chamber and having flanges at their upper ends which rest upon and make a joint with the top surface of the upper tube-plate, the lower end of the tube passing through and making a sliding joint with the floor of said tube-chamber so as to permit of free expansion and contraction longitudinally of the tube, substantially as set forth.

2. In a multitubular stove or apparatus for heating air the combination of a chamber through which the products of combustion pass, tube-plates forming the roof and floor of said chamber and resting on the walls of the chamber so that the surfaces in contact slide freely under expansion and contraction, tubes passing through the chamber and tube-plates and having flanges at their upper end which make a resting contact with the top surface of the upper tube-plate and so support the tubes which slide through holes in the lower tube-plates under expansion and contraction, substantially as set forth.

3. In a multitubular stove or apparatus for heating air the combination of a chamber through which the products of combustion pass, tube-plates comprising the roof and floor of said chamber and formed in sections of U-shaped bars each carrying a row of tubes, said bars resting at their ends on the walls of the chamber and being jointed laterally through their flanges, the end sections resting along their edges on the chamber-walls, tubes passing through the chamber and tube-plates and having flanges at their upper end which make a resting contact with the surfaces of the tube-plate sections and so suspend the tubes therefrom, the lower ends of the tubes passing loosely through the U-shaped sections forming the floor, substantially as set forth.

4. In a multitubular stove or apparatus for heating air, the combination with the walls of a chamber through which the products of combustion pass of upper tube-plates jointed by resting contact only with said walls so as to expand freely, a lower tube-plate jointed by resting contact only with the chamber-walls, tube-holes in the upper and lower tube-plates, tubes fitting loosely in said holes in the upper and lower tube-plates, a flange on the upper end of said tubes by which they are supported by resting contact with the top surface of the upper tube-plate, substantially as set forth.

5. In a multitubular stove or apparatus for heating air the tube-plates which form the top and bottom surfaces of the tube-chamber and are made up of sections in the form of bars having side flanges and orifices in the body thereof the tubes passing through the orifices while the side flanges serve as means for joining the sections to one another, the said tube-plates making a joint with the walls of the chamber by a resting contact therewith which permits of the expansion and contraction, substantially as set forth.

6. In a multitubular stove or apparatus for heating air, the combination with tube-plates which form the top and bottom surfaces of the tube-chamber and are made up of sections in the form of bars having side flanges for joining the sections together and orifices in the body of the bars for the tubes to pass through, of channels formed in the side walls of the tube-chamber for receiving the ends of and carrying by resting contact the tube-plate sections, angle-irons attached to the terminal tube-plate sections on each side, channels in the side walls of the tube-chamber for receiving and carrying by resting contact the said angle-irons, all substantially as and for the purpose set forth.

7. In a multitubular stove or apparatus for heating air, the combination with tube-plates which form the top and bottom surfaces of the tube-chamber and are made up of sections in the form of bars having side flanges for joining the sections together and orifices in the body of the bars for the tubes to pass through, of channels formed in the side walls of the tube-chamber for receiving the ends of and carrying by resting contact the tube-plate sections, angle-irons attached to the terminal tube-plate sections on each side, channel-irons of H-section fitted in the side walls of the tube-chamber and forming channels for receiving and carrying by resting contact the said angle-irons, all substantially as and for the purpose set forth.

8. In a multitubular stove or apparatus for heating air, the combination with a heating-furnace of a tube-chamber having air-tubes passing therethrough from the floor to the roof, of means whereby the tubes are suspended from the roof of the chamber and the roof and floor of the chamber are connected to the side walls by resting contact only but in such manner as to form smoke-tight joints, the products of combustion from said furnace being admitted to said tube-chamber and passing around the exterior surfaces of said tubes on their way to the chimney, an air-space being provided below said chamber from which the air to be heated flows through the interior of said tube and is heated by contact with the inner walls thereof before ascending into a collecting chamber or duct above said tube-chamber, substantially as and for the purpose set forth.

In witness whereof I have hereunto signed my name in the presence of two subscribing witnesses.

SAMUEL CLELAND DAVIDSON.

Witnesses:
GEORGE G. WARD,
HUGH T. COULTER.